July 20, 1937.   I. C. GELLMAN   2,087,769
BLADE SHARPENER AND GRINDER
Filed Aug. 14, 1935   2 Sheets-Sheet 1
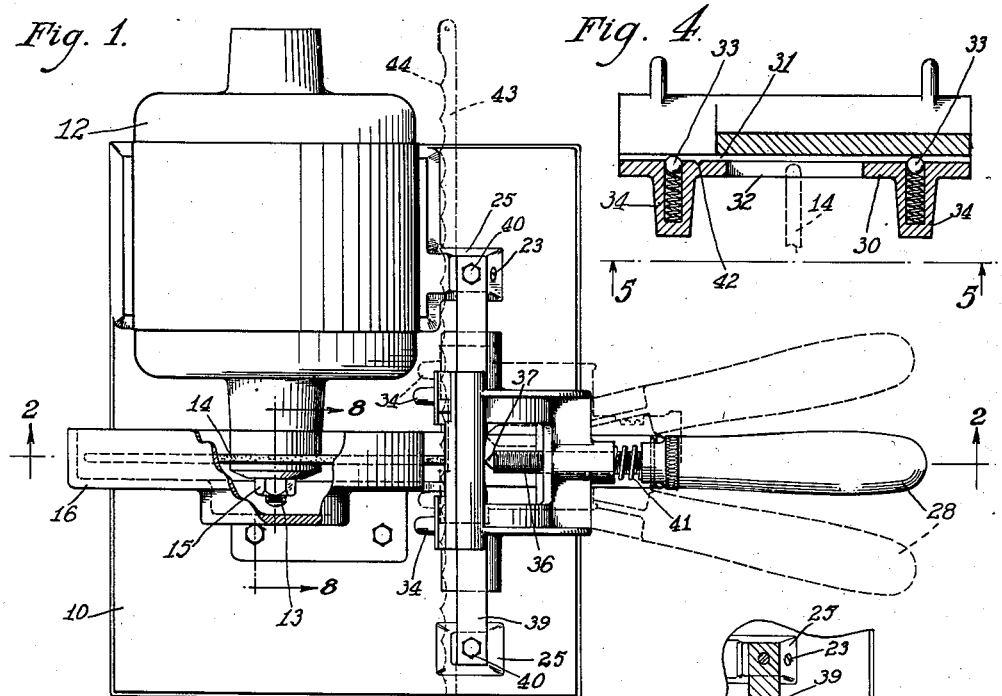
Israel C. Gellman
INVENTOR.
BY Threedy and Cannon
HIS ATTORNEYS.

July 20, 1937.  I. C. GELLMAN  2,087,769
BLADE SHARPENER AND GRINDER
Filed Aug. 14, 1935  2 Sheets-Sheet 2
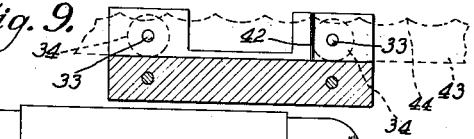
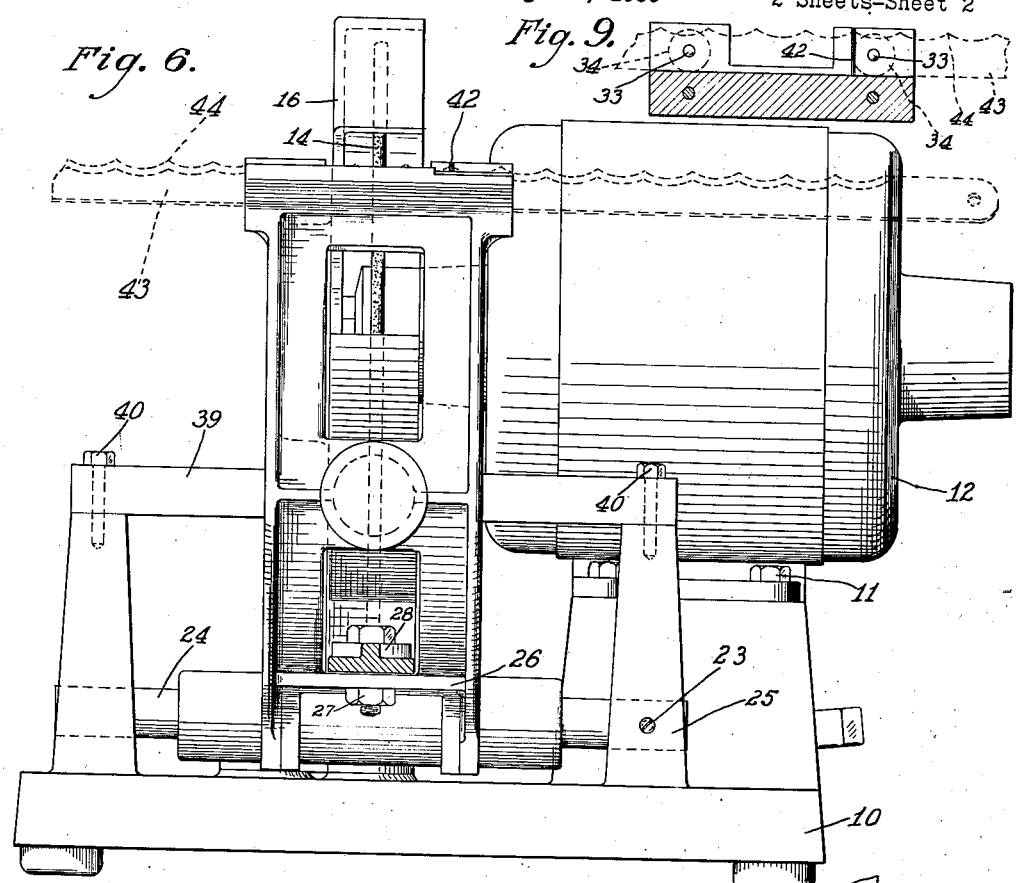
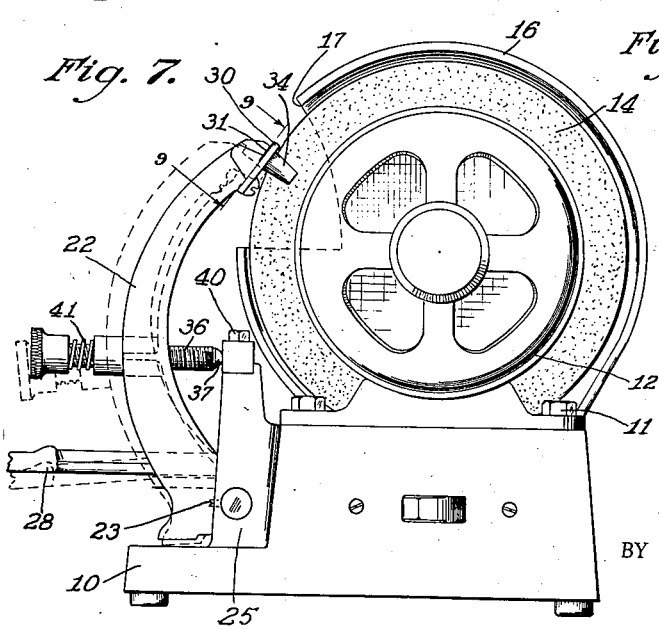
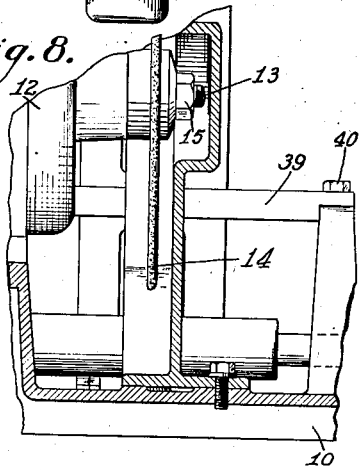
INVENTOR.
Israel C. Gellman
BY Threedy and Cannon
HIS ATTORNEYS.

Patented July 20, 1937

2,087,769

UNITED STATES PATENT OFFICE 2,087,769

BLADE SHARPENER AND GRINDER

Israel C. Gellman, Rock Island, Ill.

Application August 14, 1935, Serial No. 36,060

8 Claims. (Cl. 51—94)

This invention relates to certain novel improvements to blade sharpeners and grinders, and has for its principal object the provision of an improved construction of this character which will be highly efficient in use and economical in manufacture.

The present device, constituting the subject matter of my invention, is especially designed for grinding and sharpening blades of bread slicing machines.

In slicing machines of the type for slicing loaves of bread, there are employed a plurality of alternating series of reciprocating blades. To produce the best result, these blades travel at a high rate of speed, and to eliminate the production of crumbs or to reduce the production of crumbs to a minimum, it is essentially necessary in obtaining these best results that these blades be maintained in a thorough and complete sharpened condition.

These bread slicing machines are usually operated by others than a mechanic or one skilled in the art of bread slicing machines, and it has been the custom in general to remove the blades when they become dull, and either destroy the same or return them to the manufacturer for regrinding and sharpening. If the blades are destroyed, obviously the cost of upkeep of the machine is increased considerably. If the blades are returned to the manufacturer, considerable time, as well as the expense of regrinding and sharpening incurred by the manufacturer, is involved.

It is, therefore, one of the many objects of this invention to provide a grinder and sharpener of a construction which will permit the operation thereof by one other than a mechanic skilled in the art. Consequently the operator of a bread slicing machine by the use of the device hereinafter described may remove the blades from such bread slicing machine, and instead of discarding the blade or returning the same to the manufacturer for regrinding, may with the exercise of the minimum energy resharpen or regrind the blade and thereafter immediately replace the blade into the blade holding frame of the machine.

A still further object of the invention is to provide a device which will grind or regrind blades of the scallop type with accuracy and precision.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a top plan view of a blade grinder and sharpener embodying the invention;

Fig. 2 is a sectional detail view of the same taken substantially on line 2—2 of Fig. 1;

Fig. 3 is a fragmentary sectional detail view of the same taken substantially on line 3—3 of Fig. 2;

Fig. 4 is a fragmentary sectional detail view of the same taken substantially on line 4—4 of Fig. 2;

Fig. 5 is a fragmentary face view of the same taken substantially on line 5—5 of Fig. 4;

Fig. 6 is a front elevational view of the device illustrated in Fig. 1;

Fig. 7 is an end elevational view of the same;

Fig. 8 is a fragmentary sectional detail view of the same taken substantially on line 8—8 of Fig. 1; and Fig. 9 is a fragmentary sectional detail view of the same taken substantially on line 9—9 of Fig. 7.

To accomplish the many objects of this invention, I provide a device which comprises a base 10. Upon this base is secured through the medium of suitable bolt elements 11 a driving means 12 preferably in the form of an electric motor of any approved type and design. This motor includes an armature shaft 13 on which is mounted an abrasive member 14 in the form of a grinding disc or wheel having the required temper and hardening.

This disc or wheel 14 is removably mounted upon the armature 13 and is removably secured in position thereon through the medium of a suitable nut member 15 threaded upon the armature, as shown in Fig. 1.

Embracing the disc or wheel 14 is a suitable guard housing 16 having an open work slot 17 formed therein, as best shown in Figs. 2 and 7. Secured to the base plate 10 through the medium of bolt elements 18 is a post 19 comprising an integral stud or pin 20.

A blade holding tool is indicated at 21. This blade holding tool comprises an arcuated frame 22, the lower end of which is slidably mounted upon a shaft 24 journaled and fixed in suitable bearings 25, as at 23, provided by the base 10. This frame 22 provides a horizontal lip or extension 26 to which is loosely connected through the medium of a slot and bolt connection 27 an operating handle 28.

The inner end portion of this operating handle is provided with an opening 29, the longitudinal axis of which is disposed at an angle with respect to the longitudinal axis of the handle 28 to provide the opening 29 for the reception of the pin or stud 20, whereby the handle or operating member 28 may be expeditiously pivoted upwardly and downwardly as well as laterally.

The blade holding tool includes the holding jaw 30, which in the present instance comprises the horizontally extended blade receiving groove 31 having communication with the grinding wheel or disc receiving recess 32. The blade is frictionally held in the groove 31 through the medium of spring urged pellets 33 mounted in hollow bosses 34, as best shown in Fig. 4.

The frame 22 provides a thread bearing sleeve 35 into which is threaded a pilot bolt 36 having a conical shaped inner end portion 37 operably engaged in a concaved recess or groove 38 formed in the bar 39 secured to the base 10 through the medium of the bolts 40.

This pilot bolt 36 is prevented from accidental rotation in the sleeve 37 by means of the expansion spring 41, as best shown in Figs. 2 and 3.

In the grinding and sharpening of blades, particularly blades of the type used in connection with bread slicing machines, wherein the blades reciprocate at a high speed, it is essentially necessary from the standpoint of slicing efficiency that the scallops in the blade be of corresponding depths and spaces.

Also in the resharpening or regrinding of blades of the character herein referred to, as well as other types of blades, it is manifest that the grinding and sharpening operation may be accomplished with ease and with the minimum exertion on the part of the operator if a suitable guide is provided to enable the operator to locate the scallop to be reground or sharpened or to be ground with respect to the grinding disc or wheel.

To accomplish these various objects of the invention, I provide in the blade holder a score or indicator mark 42, the function of which will be obvious from the description of the operation of the machine now to be delineated.

In the operation of the device embodying the subject matter of my invention, the pilot bolt 36 is given the desired adjustment so as to limit the depth of the scallop to be ground into the blade. This is accomplished manifestly by rotating the pilot bolt 36 against the action of the spring 41 so as to properly dispose the conical tip 37 thereof in the pattern groove 38. After this is accomplished, the blade 43 is frictionally mounted in the holder by the action of the spring urged pellets 33.

With the blade mounted in the groove 31 of the holder, the blade is shifted so as to bring the apex 44 adjacent the scallop to be ground in alignment with the score or indicator mark 42. After this has been accomplished, the operator brings the blade into contact with the grinding disc or wheel 14 by pivoting the handle 28 upwardly so as to bring about a bearing relation between the walls of the pattern groove and the conical tip 37, whereupon a lateral or sidewise pivot of the handle 28 will in turn shift the frame 21 upon the shaft 24 creating an abrasive action between the blade and the grinding disc or wheel 14, and this operation continues until the scallop has been ground down to the depth and to the shape permitted by the co-action of the pilot bolt 36 and the pattern groove 38.

The shape and depth of the scallop of the blade may be varied. For example, instead of providing a concaved pattern groove, there my be provided a V-shaped pattern groove, and the depth of the grooves may be varied for the intended purpose.

From the description herein taken in connection with the accompanying drawings, it is manifest that I provide a device which is substantially portable and which may be operated and manipulated by one other than a skilled mechanic for the grinding of new blades of the type indicated herein, or for the purpose of regrinding and sharpening used blades.

When grinding scallops in new blades, it is manifest that after the first scallop is formed, the operator locates the next scallop by adjusting the apex of the scallop previously formed in alignment with the score or indicating line or mark 42.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a device of the class described, a support, a power driven abrasive wheel thereon and a work holder for positioning work in operative engagement with said wheel, said holder comprising a member pivotally mounted on said frame for simultaneously movement about two axes at right angles to one another, manually operable means for moving the said member about one of said axes, and automatic means including stationary pilot guiding means on said frame and a pilot member on said work holder and movable in said pilot guiding means for pivoting said work holder about its other said axis responsive to its manual pivotation about the first said axis.

2. A device of the class described comprising a driving member and an abrasive member driven thereby, a work holder, means supporting the work holder for movement relative to the abrasive member simultaneously about two axes, one horizontal and the other vertical, together with manual means for pivoting said work holder about the said vertical axis, and automatic means including a stationary guiding member and a guided member on said work holder and movable in said guiding member responsive to the manual pivotation of the work holder for pivoting the latter about the said horizontal axis.

3. Means for guiding the operative engagement between work and an abrasive member operative on the work comprising a pivotally supported work holder movable simultaneously in two planes, a pilot bolt carried by the holder, and a stationary guiding member adjacent the holder and having a pilot groove in which said pilot bolt is adapted to move to effect movement of the work holder in one plane when the same is moved in its other said plane, together with manual means for pivoting said work holder in the last-mentioned said plane.

4. A blade sharpening device including a frame, power driven abrasive means thereon and a work holder comprising a turret mounted on said frame for pivotal movement about a first axis, manual pivoting means for said turret and an arcuate arm pivotally mounted on said turret for movement about a second axis at an angle to said first axis toward and away from said abrasive means, together with means for effecting the movement of said arcuate member when said turret is pivoted, said means including a pilot member on said frame and a pilot bolt on said arcuate member and movable in said pilot member responsive to the pivotal movement of the turret, whereby the said work holder may be pivoted about two axes simultaneously.

5. A work holder for positioning work relative to a tool, said holder comprising a pivotally mounted turret and manual means for pivoting the latter, and an arm pivotally mounted on said turret for movement about an axis at right angles to the axis of pivotation of the turret, together with means for automatically effecting the pivotal movement of said arm about said last-mentioned axis when said turret is moved about its said axis of pivotation, said means including a stationary guiding member having a pilot formation and a pilot member on said arm and having a part movable in said pilot formation responsive to the pivotal movement of said turret.

6. A blade sharpening device including a frame, a sharpening member thereon, a turret mounted on said frame for movement about a first axis, a work arm including work holding means and pivotally mounted on said turret for movement about a second axis normal to said first axis and a pilot member on said arm engageable with a stationary pilot guiding member on said frame for effecting the movement of said arm about the said second axis when the said turret is moved about said first axis, and manually operable means operatively connected with said turret for pivoting the same.

7. A blade sharpening device including a sharpening member and means for guiding work relative to said sharpening member and comprising an arcuate arm having at one extremity means for supportably engaging work and being mounted at its opposite end for pivotal movement toward and away from said sharpening member, means supporting said pivotally mounted arcuate member for pivotal movement about an axis disposed at a substantial angle to the axis of pivotal movement of said arcuate member toward and away from the sharpening member, together with means for pivoting said arcuate member about said angularly disposed axis, a stationary pilot guide device supported near said arcuate member at a point between its extremities and an adjustable pilot element on said arcuate member between its extremities and engageable with said stationary pilot device to effect movement of said arcuate member toward and away from said sharpening member when the arcuate member is pivoted about said angularly disposed axis.

8. In a blade sharpening device having a sharpening element and a base member therefor, work holding means including a turret pivotally mounted on said base member, an arcuate arm pivotally attached at one end to said turret member for movement about an axis normal to the pivotal axis of said turret, lever means for pivoting said turret, means at the opposite end of said arcuate arm for clamping work in sharpening position relative to said sharpening device, a stationary guide element supported on said base, and a pilot member adjustably carried on said arcuate arm between its ends and engageable with said stationary guide element to move said arcuate arm about its pivotal connection on said turret when the latter is pivoted.

ISRAEL C. GELLMAN.